US011894174B2

(12) United States Patent
Ohkubo et al.

(10) Patent No.: US 11,894,174 B2
(45) Date of Patent: Feb. 6, 2024

(54) COIL COMPONENT

(71) Applicant: TDK CORPORATION, Tokyo (JP)

(72) Inventors: Hitoshi Ohkubo, Tokyo (JP); Manabu Ohta, Tokyo (JP); Ryo Fukuoka, Tokyo (JP); Hironori Kimata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 448 days.

(21) Appl. No.: 17/093,808

(22) Filed: Nov. 10, 2020

(65) Prior Publication Data

US 2021/0151234 A1 May 20, 2021

(30) Foreign Application Priority Data

Nov. 15, 2019 (JP) ................................ 2019-207240

(51) Int. Cl.
*H01F 27/28* (2006.01)
*H01F 17/04* (2006.01)

(52) U.S. Cl.
CPC ......... *H01F 17/04* (2013.01); *H01F 27/2804* (2013.01); *H01F 2017/048* (2013.01)

(58) Field of Classification Search
CPC ................. H01F 17/04; H01F 27/2804; H01F 2017/048; H01F 17/0013; H01F 27/28; H01F 27/306; H01F 27/324; H01F 17/0006; H01F 27/022; H01F 27/292; H01F 27/327
USPC .................................................. 336/200, 232
See application file for complete search history.

(56) References Cited

U.S. PATENT DOCUMENTS

| | | | | |
|---|---|---|---|---|
| 2014/0111273 A1* | 4/2014 | Jou | H01L 24/20 | 327/564 |
| 2015/0035634 A1* | 2/2015 | Nakamura | H01F 41/046 | 336/170 |
| 2015/0042440 A1* | 2/2015 | Tsurumi | H01F 17/0006 | 336/221 |
| 2015/0109088 A1* | 4/2015 | Kim | H01F 17/0013 | 336/200 |
| 2016/0155556 A1* | 6/2016 | Ohkubo | H01F 41/046 | 336/83 |
| 2016/0372259 A1* | 12/2016 | Banba | H01F 27/2823 | |
| 2017/0178789 A1* | 6/2017 | Kim | H01F 17/04 | |

(Continued)

FOREIGN PATENT DOCUMENTS

| | | |
|---|---|---|
| CN | 108573791 A | 9/2018 |
| CN | 109903967 A | 6/2019 |

(Continued)

*Primary Examiner* — Shawki S Ismail
*Assistant Examiner* — Kazi S Hossain
(74) *Attorney, Agent, or Firm* — Oliff PLC

(57) ABSTRACT

In a coil component, a height h1 of a pedestal portion of a resin wall corresponds to the height position of a step portion. In addition, a height of a seed portion corresponds to the plating start position at a time when a winding portion of a coil is plated and grown. The plating start position and the step portion are designed to be close to each other by the height h1 of the pedestal portion and the height h2 of the seed portion satisfying $0.3 \leq h1/h2 \leq 10$. Accordingly, although the coil component has a configuration in which the resin wall has the step portion, the inside of the step portion is sufficiently filled with a coil conductor, and thus deterioration of characteristics is suppressed.

6 Claims, 9 Drawing Sheets

(56) References Cited

U.S. PATENT DOCUMENTS

| | | | | |
|---|---|---|---|---|
| 2018/0166194 | A1 | 6/2018 | Choi | |
| 2018/0261377 | A1 | 9/2018 | Kim | |
| 2019/0180913 | A1* | 6/2019 | Moon | H01F 27/2804 |
| 2019/0180915 | A1 | 6/2019 | Moon et al. | |
| 2019/0180927 | A1 | 6/2019 | Moon et al. | |
| 2019/0304680 | A1 | 10/2019 | Choi et al. | |

FOREIGN PATENT DOCUMENTS

| | | | | |
|---|---|---|---|---|
| CN | 109903975 | A | 6/2019 | |
| JP | 2017-017139 | A | 1/2017 | |
| JP | 2017017139 | A * | 1/2017 | H01F 17/0013 |
| KR | 10-2017-0003433 | A | 1/2017 | |

* cited by examiner

COIL COMPONENT

CROSS-REFERENCE TO RELATED APPLICATIONS

This application is based upon and claims the benefit of priority from Japanese Patent Application No. 2019-207240, filed on 15 Nov. 2019, the entire contents of which are incorporated herein by reference.

TECHNICAL FIELD

The present disclosure relates to a coil component.

BACKGROUND

A coil component according to the related art is disclosed in, for example, Japanese Unexamined Patent Publication No. 2017-17139, in which the winding portion of a coil is plated and grown between resin walls provided on the main surface of a substrate. Disclosed in Japanese Unexamined Patent Publication No. 2017-17139 is the resin wall having a wide pedestal portion positioned on the substrate side and narrow wall portions extending from the pedestal portion in a direction away from the substrate. A step portion is formed between the pedestal portion and the wall portion.

SUMMARY

In the coil component according to the related art described above, the resin wall has the wall portion narrower than the pedestal portion, and thus the amount of coil conductors between the wall portions can be increased and coil characteristics can be improved as a result. On the other hand, the plating growth is difficult in the step portion between the pedestal portion and the wall portion when the winding portion of the coil is plated and grown between the resin walls and the step portion may not be filled with the coil conductor and the characteristics may deteriorate in a case where no sufficient plating growth is performed in the step portion.

An object of the present disclosure is to provide a coil component having improved characteristics.

A coil component according to one aspect of the present disclosure includes a substrate, a coil having a seed portion provided on a main surface of the substrate and a plating portion covering the seed portion, and a resin body provided on the main surface of the substrate and having a plurality of resin walls, a winding portion of the coil extends between the plurality of resin walls. The resin wall has a pedestal portion in contact with the main surface of the substrate and a wall portion extending from the pedestal portion in a direction away from the substrate and narrower than the pedestal portion. $0.3 \leq h1/h2 \leq 10$ is satisfied when a height of the pedestal portion of the resin wall is h1 and a height of the seed portion of the coil is h2.

In the coil component described above, the height h1 of the pedestal portion corresponds to the height position of the step portion between the pedestal portion and the wall portion and the height h2 of the seed portion corresponds to the plating start position at a time when the winding portion of the coil is plated and grown. The plating start position and the step portion are close to each other in a case where the height h1 of the pedestal portion and the height h2 of the seed portion satisfy $0.3 \leq h1/h2 \leq 10$. Accordingly, the step portion is filled with a coil conductor and deterioration of characteristics is suppressed.

In the coil component according to another aspect, main components of a resin material constituting the pedestal portion and a resin material constituting the wall portion are the same.

According to the present disclosure, a coil component having improved characteristics is provided.

DETAILED DESCRIPTION

Figure 1:
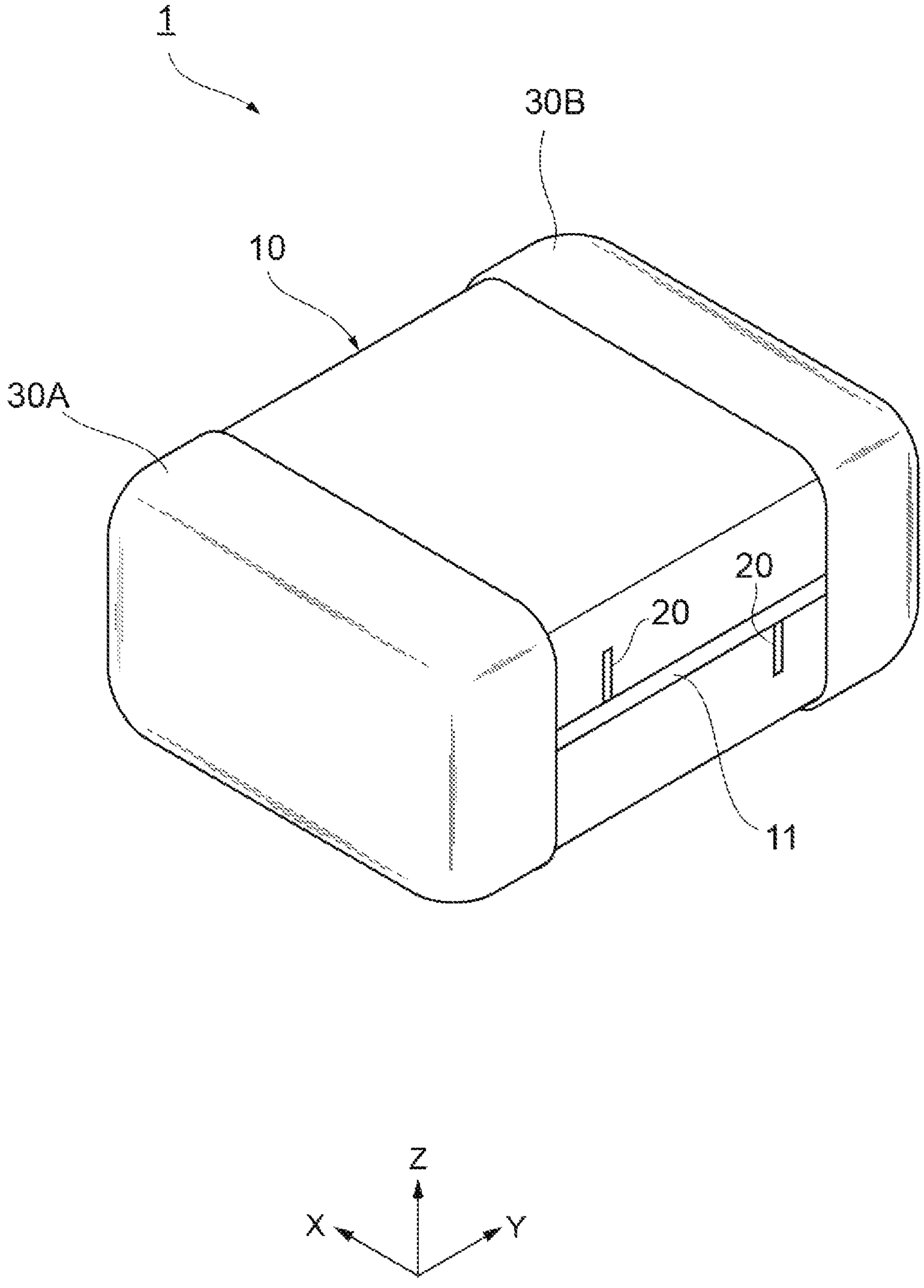
FIG. 1 is a schematic perspective view of a coil component according to an embodiment of the present disclosure.

Hereinafter, an embodiment of the present disclosure will be described in detail with reference to the accompanying drawings. It should be noted that the same reference numerals are used for the same elements or elements having the same function and redundant description is omitted in the description.

The structure of the coil component according to the embodiment of the present disclosure will be described first with reference to FIGS. 1 to 4. For convenience of description, XYZ coordinates are set as illustrated in the drawings. In other words, the thickness direction of the flat coil element is set as the Z direction, the facing direction of external terminal electrodes is set as the Y direction, and the direction that is orthogonal to the Z direction and the Y direction is set as the X direction.

A coil component 1 includes a main body portion 10 having a substantially rectangular parallelepiped shape and a pair of external terminal electrodes 30A and 30B provided so as to cover a pair of end surfaces of the main body portion 10 facing each other. As an example, the coil component 1 is designed to have a long-side dimension of 2.0 mm, a short-side dimension of 1.6 mm, and a height dimension of 0.9 mm.

The structure of the coil component 1 will be described below with a procedure for manufacturing the main body portion 10 illustrated.

Figure 2:
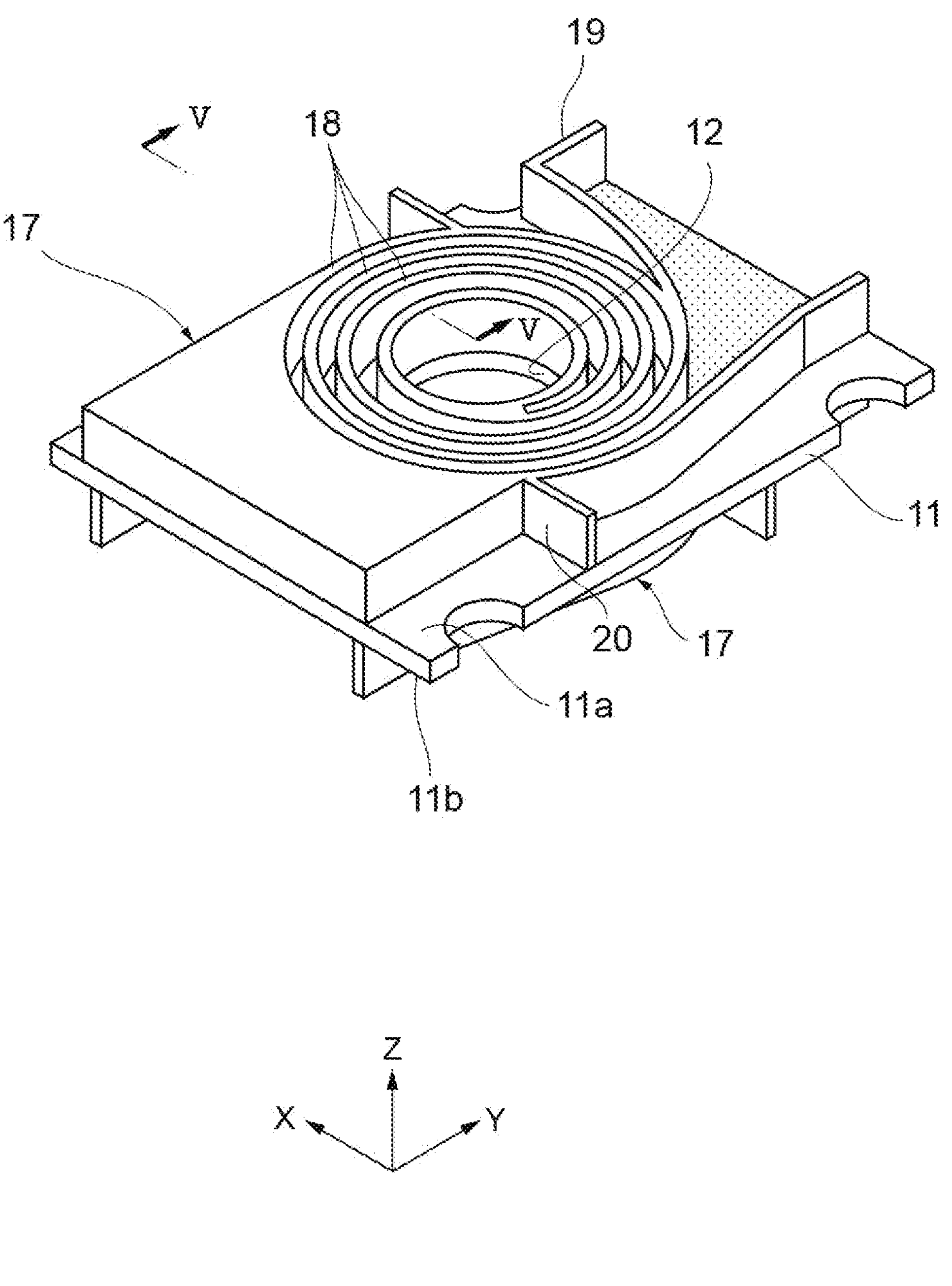
FIG. 2 is a perspective view illustrating a substrate used for manufacturing the coil component illustrated in FIG. 1.

The main body portion 10 includes a substrate 11 illustrated in FIG. 2. The substrate 11 is a flat plate-shaped and rectangular member made of a non-magnetic insulating material. A substantially circular opening 12 penetrating the substrate 11 is provided at the middle part of the substrate 11 so as to interconnect main surfaces 11*a* and 11*b*. A substrate in which a glass cloth is impregnated with a cyanate resin (bismaleimide triazine (BT) resin: registered trademark) and that has a plate thickness of 60 μm can be used as the substrate 11. It should be noted that polyimide, aramid, or the like can also be used in addition to the BT resin. Ceramic or glass can also be used as the material of the substrate 11. A mass-produced printed board material may be the material of the substrate 11, in particular, a resin material used for a BT, FR4, or FR5 printed board.

Figure 3:
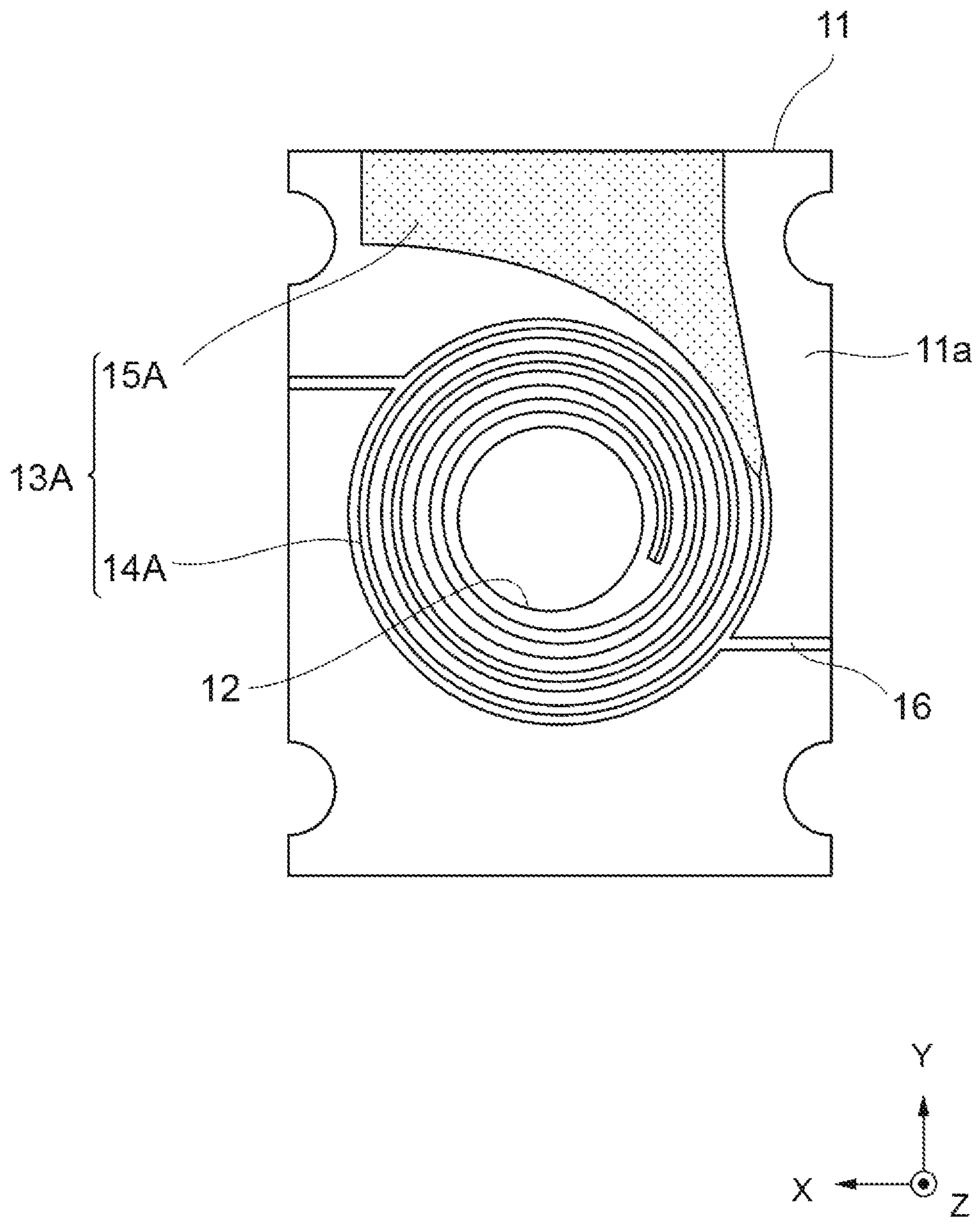
FIG. 3 is a plan view illustrating the seed pattern of the substrate illustrated in FIG. 2.

As illustrated in FIG. 3, a seed pattern 13A for plating growth of a coil 13 (described later) is formed on the main surfaces 11*a* and 11*b* of the substrate 11. The seed pattern 13A has a spiral pattern 14A around the opening 12 of the substrate 11 and an end portion pattern 15A formed in the Y-direction end portion of the substrate 11, and the patterns 14A and 15A are formed continuously and integrally. It should be noted that the coil 13 that is provided on the main surface 11*a* side and the coil 13 that is provided on the main surface 11*b* side have opposite electrode pull-out directions. Accordingly, the end portion pattern 15A on the main surface 11*a* side and the end portion pattern on the main surface 11*b* side are formed in different Y-direction end portions of the substrate 11.

Returning to FIG. 2, a resin body 17 is provided on each of the main surfaces 11*a* and 11*b* of the substrate 11. The resin body 17 is a thick film resist patterned by known photolithography. The resin body 17 has resin walls 18 that define a growth region of a winding portion 14 of the coil 13 and a resin wall 19 that defines a growth region of an extraction electrode portion 15 of the coil 13.

Figure 4:
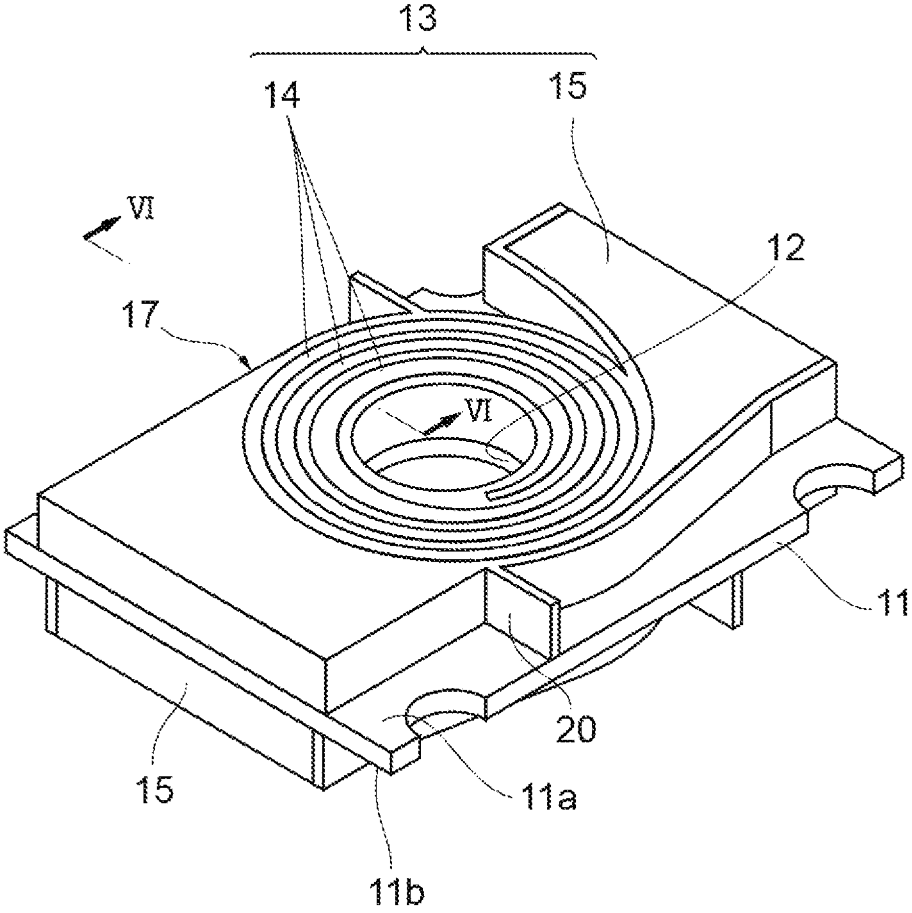
FIG. 4 is a perspective view illustrating one step of a method for manufacturing the coil component illustrated in FIG. 1.
Figure 4:
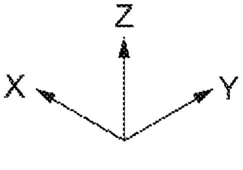

FIG. 4 illustrates the state of the substrate 11 at a time when the coil 13 is plated and grown by means of the seed pattern 13A. A known plating growth method can be adopted for the plating growth of the coil 13.

The coil 13 is made of copper and has the winding portion 14 formed on the spiral pattern 14A of the seed pattern 13A and the extraction electrode portion 15 formed on the end portion pattern 15A of the seed pattern 13A. When viewed in plan view, the coil 13 has the shape of a planar spiral air-core coil extending in parallel to the main surfaces 11*a* and 11*b* of the substrate 11 as in the case of the seed pattern 13A. More specifically, the winding portion 14 of the substrate upper surface 11*a* is a spiral that is counterclockwise along the direction toward the outside when viewed from the upper surface side and the winding portion 14 of the substrate lower surface 11*b* is a spiral that is counterclockwise along the direction toward the outside when viewed from the lower surface side. The end portions of the coils 13 of the substrate upper surface 11*a* and the substrate lower surface 11*b* are connected to each other via, for example, a through hole separately provided in the vicinity of the opening 12. When a current is passed in one direction through the two coils 13, the directions of rotation in which the currents flow through the coils 13 are the same, and thus the magnetic fluxes that are generated in the coils 13 are superimposed and strengthened.

Figure 5:
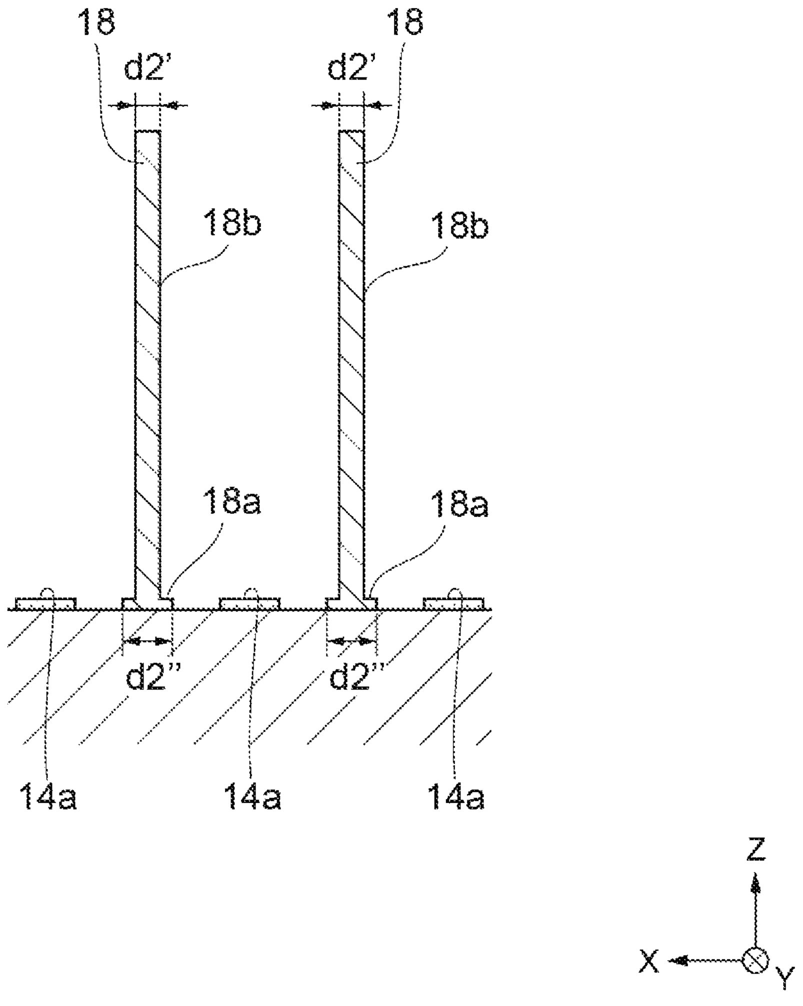
FIG. 5 is a cross-sectional view taken along line V-V of FIG. 2.
Figure 6:
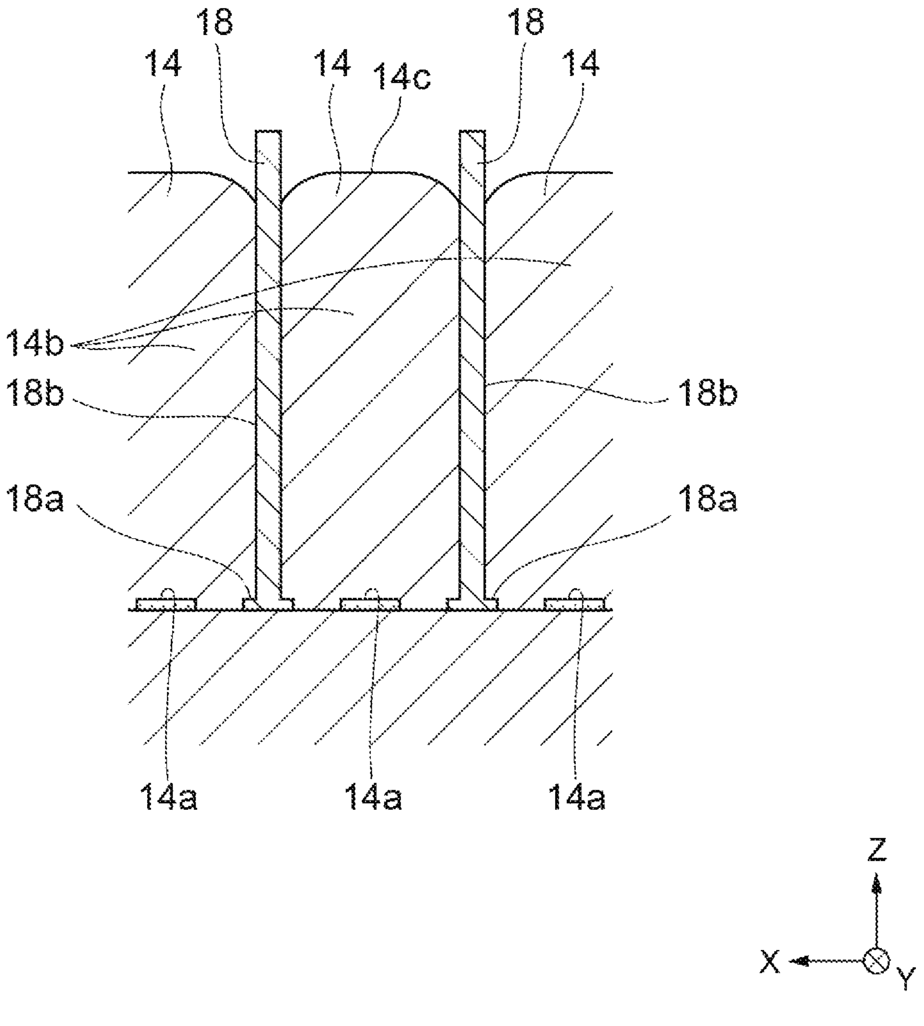
FIG. 6 is a cross-sectional view taken along line VI-VI of FIG. 4.

FIG. 5 illustrates the state of the substrate 11 before the plating growth illustrated in FIG. 2 and is a cross-sectional view taken along line V-V of FIG. 2. FIG. 6 illustrates the state of the substrate 11 after the plating growth illustrated in FIG. 4 and is a cross-sectional view taken along line VI-VI of FIG. 4.

As illustrated in FIGS. 5 and 6, the resin walls 18 extending along the normal direction of the substrate 11 (Z direction) are formed on the substrate 11 and the winding portion 14 of the coil 13 grows in the Z direction between the resin walls 18. The growth region of the winding portion 14 of the coil 13 is defined in advance by the resin walls 18 formed on the substrate 11 before the plating growth.

The resin wall 18 has a pedestal portion 18*a* that is in contact with the main surface 11*a* of the substrate 11 and a wall portion 18*b* extending from the pedestal portion 18*a* in a direction away from the substrate 11 (that is, the Z direction). The wall portion 18*b* has a uniform width d2', and the width d2' of the wall portion 18*b* is designed to be smaller than a width d" of the pedestal portion 18*a*. In the present embodiment, the width of the wall portion 18*b* is 5 μm and the width d" of the pedestal portion 18*a* is 10 μm. In a case where the wall portion 18*b* is narrower than the pedestal portion 18*a*, the amount of coil conductors between the wall portions 18*b* significantly increases and coil characteristics are improved as a result. In addition, the cross-sectional area on the substrate 11 side is increased by the wide pedestal portion 18*a*, and thus the strength of the resin wall 18 increases and distortion and collapse of the resin wall 18 are suppressed.

Figure 7:
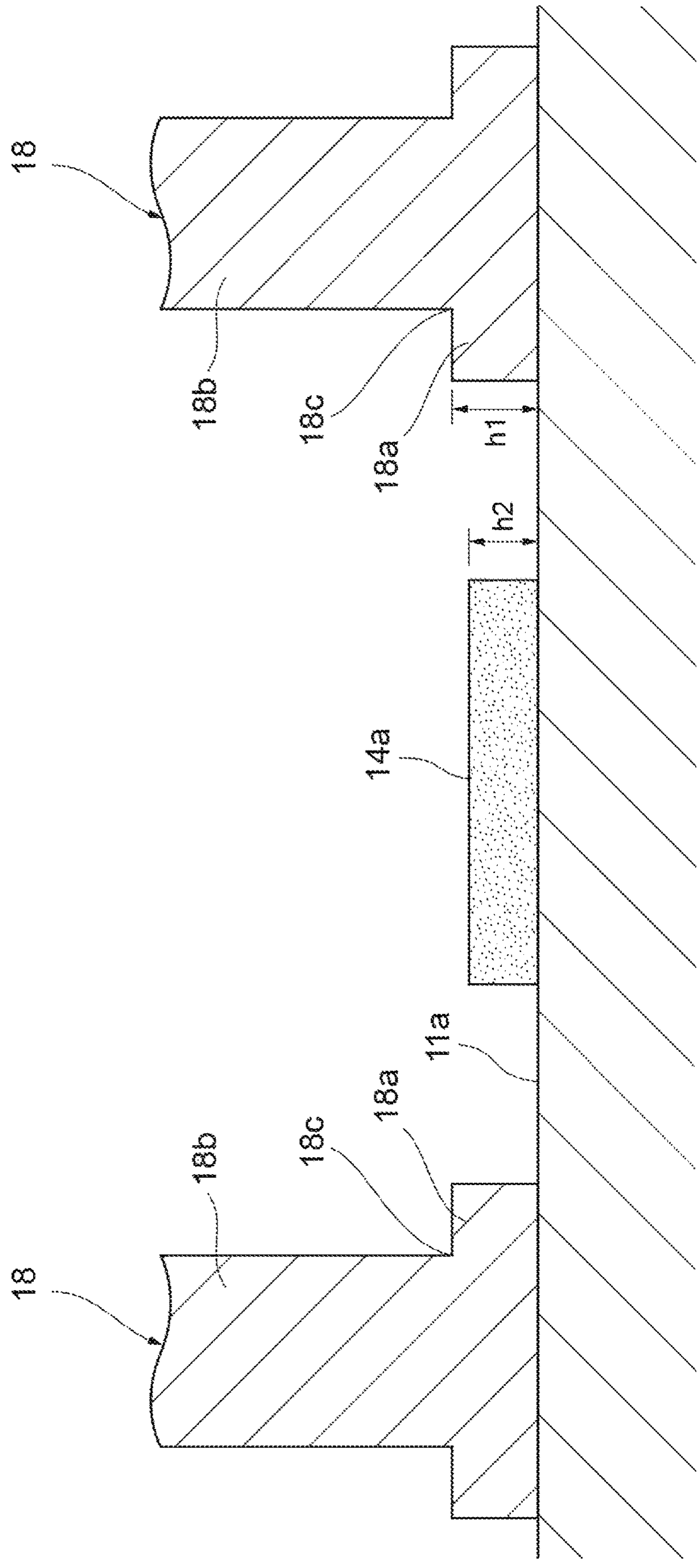
FIG. 7 is an enlarged view of a main part of the cross section illustrated in FIG. 5.

The wall portion 18*b* extends in the Z direction from the center of the pedestal portion 18*a* in the width direction (X direction in FIG. 5). As a result, a step portion 18*c* is formed between the pedestal portion 18*a* and the wall portion 18*b* as illustrated in FIG. 7.

A height h1 of the pedestal portion 18*a* is designed to be approximately equal to a height h2 of a seed portion 14*a*. The height h1 of the pedestal portion 18*a* is, for example, 5 μm to 50 μm and is 15 μm as an example. The height h2 of the seed portion 14*a* is, for example, 5 μm to 15 μm and is 10 μm as an example. The height h1 of the pedestal portion 18*a* may be equal to the height h2 of the seed portion 14*a*, may exceed the height h2 of the seed portion 14*a*, or may be exceeded by the height h2 of the seed portion 14*a*. In the present embodiment, the height h1 of the pedestal portion 18*a* and the height h2 of the seed portion 14*a* are designed to satisfy $0.3 \le h1/h2 \le 10$. The height h1 of the pedestal portion 18*a* and the height h2 of the seed portion 14*a* may satisfy $0.6 \le h1/h2 \le 1.8$ or may satisfy $0.75 \le h1/h2 \le 1.6$ in the relationship thereof.

The pedestal portion 18*a* and the wall portion 18*b* are integrally formed, and the main components of the resin material constituting the pedestal portion 18*a* and the resin material constituting the wall portion 18*b* are the same. The pedestal portion 18*a* and the wall portion 18*b* of the resin wall 18 can be molded by single exposure. For example, the type and amount of addition of secondary components (such as a crosslinking agent) can be changed between the resin material of the pedestal portion 18*a* and the resin material of the wall portion 18*b*.

The winding portion 14 of the coil 13 includes the seed portion 14*a* as a part of the spiral pattern 14A and a plating portion 14*b* plated and grown on the seed portion 14*a* and is formed by the plating portion 14*b* gradually growing around the seed portion 14*a*. At this time, the winding portion 14 of the coil 13 grows so as to fill the space defined between the two adjacent resin walls 18 and is formed in the same shape as the space defined between the resin walls 18. As a result, the winding portion 14 of the coil 13 is shaped so as to extend long along the normal direction of the substrate 11 (Z direction). In other words, the shape of the winding portion 14 of the coil 13 is adjusted by the shape of the space defined between the resin walls 18 being adjusted and the winding portion 14 of the coil 13 can be formed in the shape as designed.

As illustrated in FIG. 6, the winding portion 14 of the coil 13 may be lower in height than the resin wall 18. In this case, it is adjusted such that the plating growth of the winding portion 14 of the coil 13 stops at a position lower than the height of the resin wall 18. When the winding portion 14 of the coil 13 is lower in height than the resin wall 18, the winding portion 14 has a thickness as a designed dimension over the height direction. In addition, a situation in which the adjacent winding portions 14 come into contact with each other occurs when the height of the winding portion 14 of the coil 13 exceeds the height of the resin wall 18.

It should be noted that the plating growth of the coil 13 described above is performed on both main surfaces 11*a* and 11*b* of the substrate 11. The end portions of the coils 13 of the main surfaces 11*a* and 11*b* are interconnected and conductive at the opening of the substrate 11.

Figure 8:
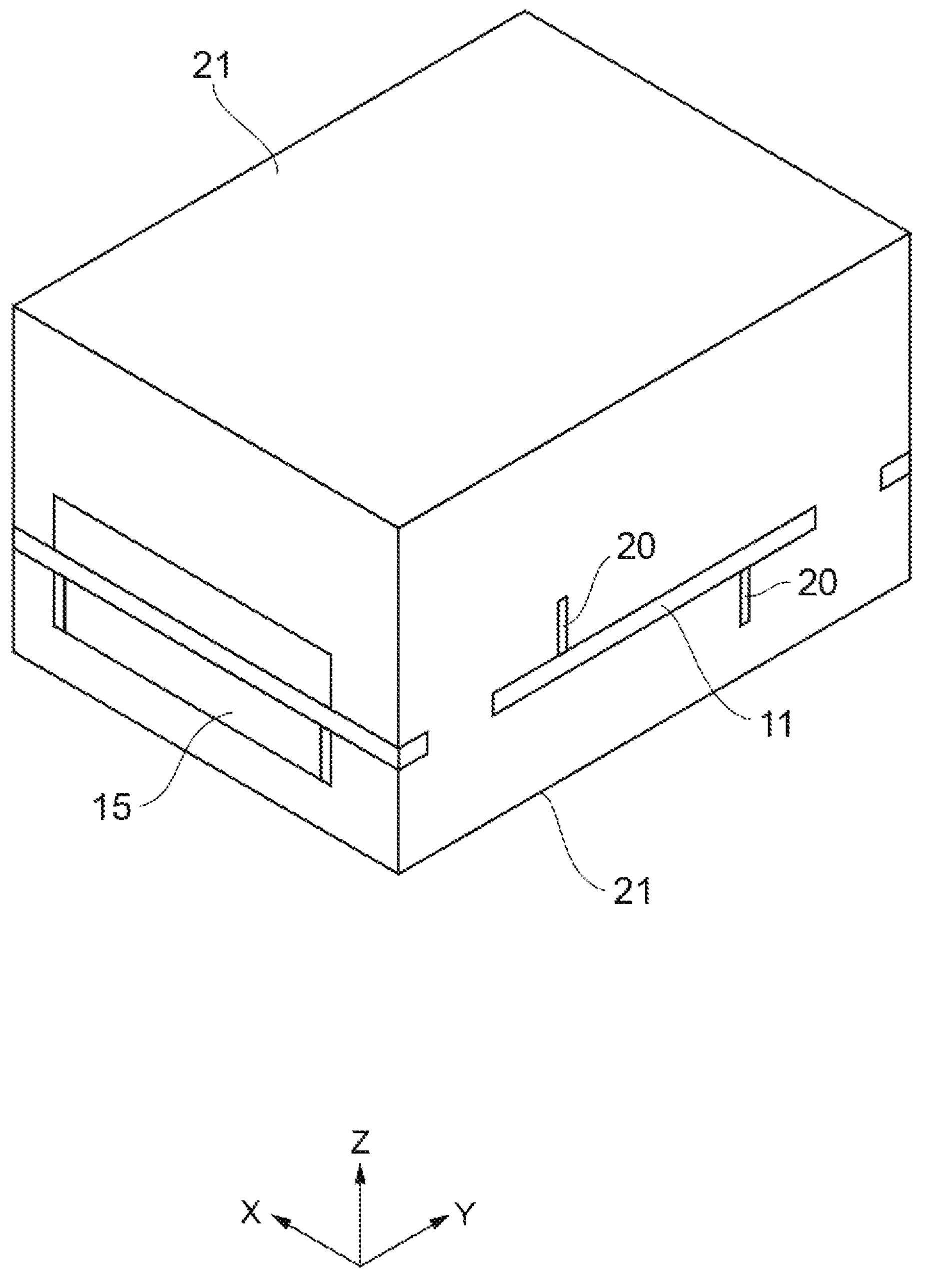
FIG. 8 is a perspective view illustrating one step of the method for manufacturing the coil component illustrated in FIG. 1.

After the coil 13 is plated and grown on the substrate 11, the substrate 11 is entirely covered with a coating resin 21 as illustrated in FIG. 8. In other words, the coating resin 21 integrally covers the resin body 17 and the coils 13 of the main surfaces 11*a* and 11*b* of the substrate 11. The resin body 17 constitutes a part of the coil component 1 while remaining in the coating resin 21. The coating resin 21, which is made of a metal magnetic powder-containing resin, is formed by being formed on the substrate 11 in a wafer state and then cured.

The metal magnetic powder-containing resin constituting the coating resin 21 is configured by a resin in which metal magnetic powder is dispersed. The metal magnetic powder may be configured by, for example, an iron-nickel alloy (permalloy alloy), carbonyl iron, an amorphous, a non-crystalline or crystalline FeSiCr-based alloy, or sendust. The resin used for the metal magnetic powder-containing resin is, for example, a thermosetting epoxy resin. The content of the metal magnetic powder in the metal magnetic powder-containing resin is, for example, 90 to 99 wt %.

Figure 9:
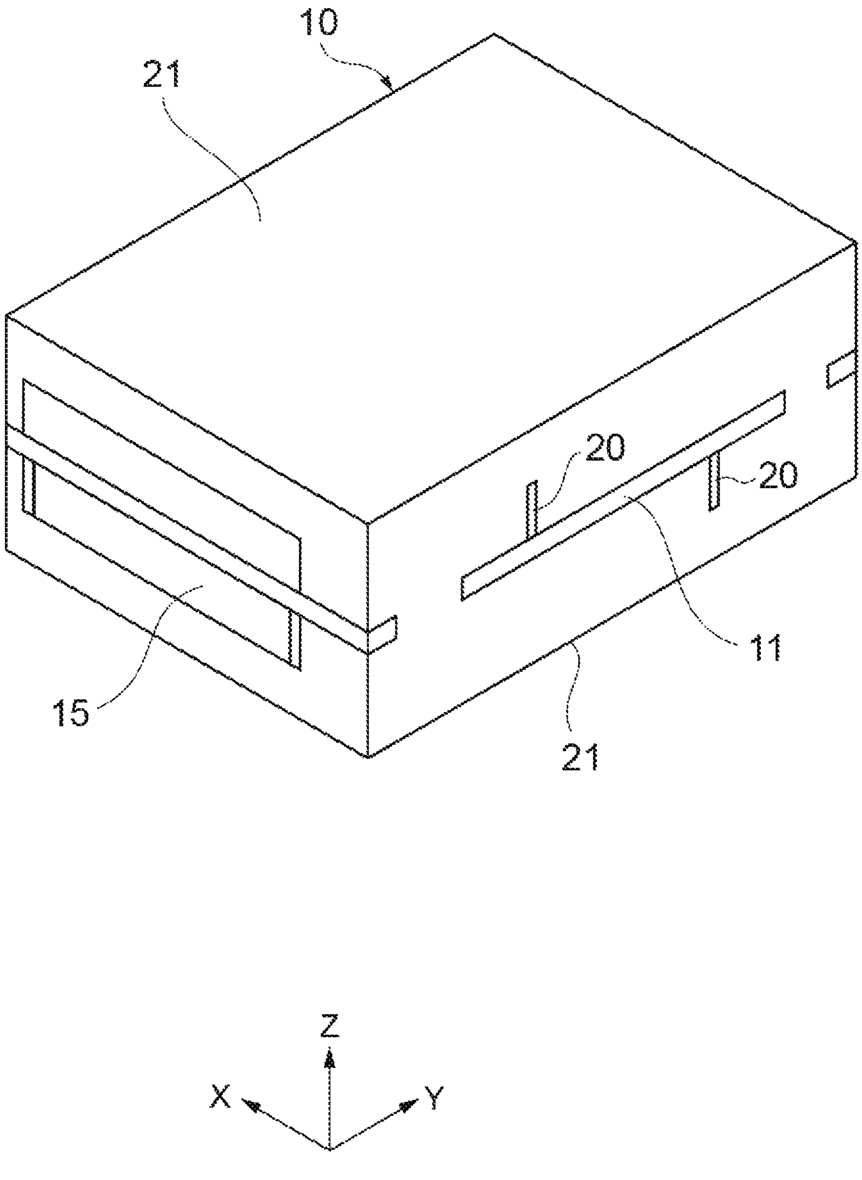
FIG. 9 is a perspective view illustrating one step of the method for manufacturing the coil component illustrated in FIG. 1.

Further, the main body portion 10 illustrated in FIG. 9 can be obtained by dicing and chip formation. After the chip formation, edge chamfering by barrel polishing or the like may be performed if necessary.

Finally, the coil component 1 is completed by the external terminal electrodes 30A and 30B being provided on the end surfaces of the main body portion 10 where the end portion pattern 15A is exposed (end surfaces facing each other in the Y direction) so as to be electrically connected to the end portion pattern 15A. The external terminal electrodes 30A and 30B are electrodes for connection to a circuit of a substrate on which the coil component is mounted and may have a multi-layer structure. For example, the external terminal electrodes 30A and 30B can be formed by metal plating being applied to a resin electrode material after the resin electrode material is applied to the end surface. Cr, Cu, Ni, Sn, Au, solder, and so on can be used for the metal plating of the external terminal electrodes 30A and 30B.

In the coil component 1 described above, the height h1 of the pedestal portion 18*a* of the resin wall 18 corresponds to the height position of the step portion 18*c*. In addition, the height h2 of the seed portion 14*a* corresponds to the plating start position at a time when the winding portion 14 of the coil 13 is plated and grown. The plating start position and the step portion 18*c* are designed to be close to each other by the height h1 of the pedestal portion 18*a* and the height h2 of the seed portion 14*a* satisfying $0.3 \leq h1/h2 \leq 10$. In this case, the coil conductor that is plated and grown from the seed portion 14*a* easily wraps around the step portion 18*c* and the inside of the step portion 18*c* is easily filled with the coil conductor. In other words, a coil conductor-less depletion portion is unlikely to be generated between the resin walls 18 (in the step portion in particular) and the space between the resin walls 18 is filled with sufficient coil conductors. Accordingly, although the coil component 1 has a configuration in which the resin wall 18 has the step portion 18*c*, the inside of the step portion 18*c* is sufficiently filled with the coil conductor, and thus high characteristics can be realized. For example, the direct current resistance of the coil conductor is reduced because the cross-sectional area of the coil conductor is larger in a case where the inside of the step portion 18*c* of the resin wall 18 is filled with the coil conductor than in a case where the inside of the step portion 18*c* of the resin wall 18 is not filled with the coil conductor.

It should be noted that the coil component 1 is not limited to the above-described form and various forms can be adopted. For example, the coil may be provided on both substrate surfaces or may be provided on one substrate surface.

What is claimed is:

1. A coil component comprising:

a substrate;

a coil having a seed portion provided on a main surface of the substrate and a plating portion covering the seed portion; and a resin body provided on the main surface of the substrate and having a plurality of resin walls, a winding portion of the coil extends between the plurality of resin walls, wherein each of the resin walls has a pedestal portion in contact with the main surface of the substrate and a wall portion extending from the pedestal portion in a direction away from the substrate and narrower than the pedestal portion, $h1/h2<1$ is satisfied in at least the resin wall located between the winding portions of the coil when a height of the pedestal portion of the resin wall is h1 and a height of the seed portion of the coil is h2, and the pedestal portion of the resin wall located between the winding portions of the coil is apart from the seed portion of the coil.

2. The coil component according to claim 1, wherein main components of a resin material constituting the pedestal portion and a resin material constituting the wall portion are the same.

3. The coil component according to claim 1, wherein the pedestal portion and the wall portion of each resin wall are formed integrally.

4. The coil component according to claim 1, wherein $0.3 \leq h1/h2 < 1$.

5. The coil component according to claim 1, wherein $0.6 \leq h1/h2 < 1$.

6. The coil component according to claim 1, wherein $0.75 \leq h1/h2 < 1$.

* * * * *